May 26, 1925.  
W. T. FELS  
1,539,655  
WALL MOLDING APPARATUS  
Filed Aug. 4, 1924 3 Sheets-Sheet 1
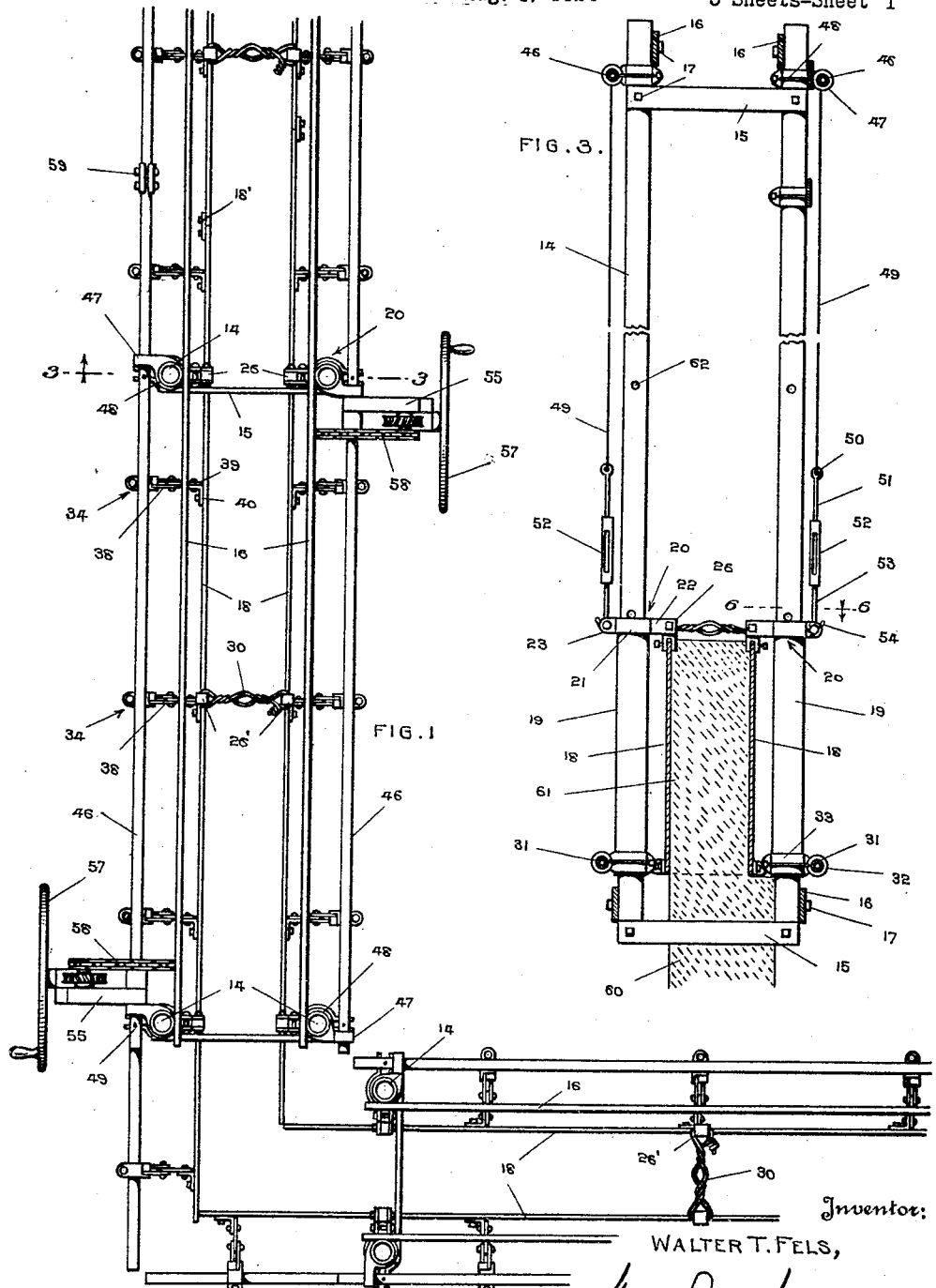
Inventor:
WALTER T. FELS,

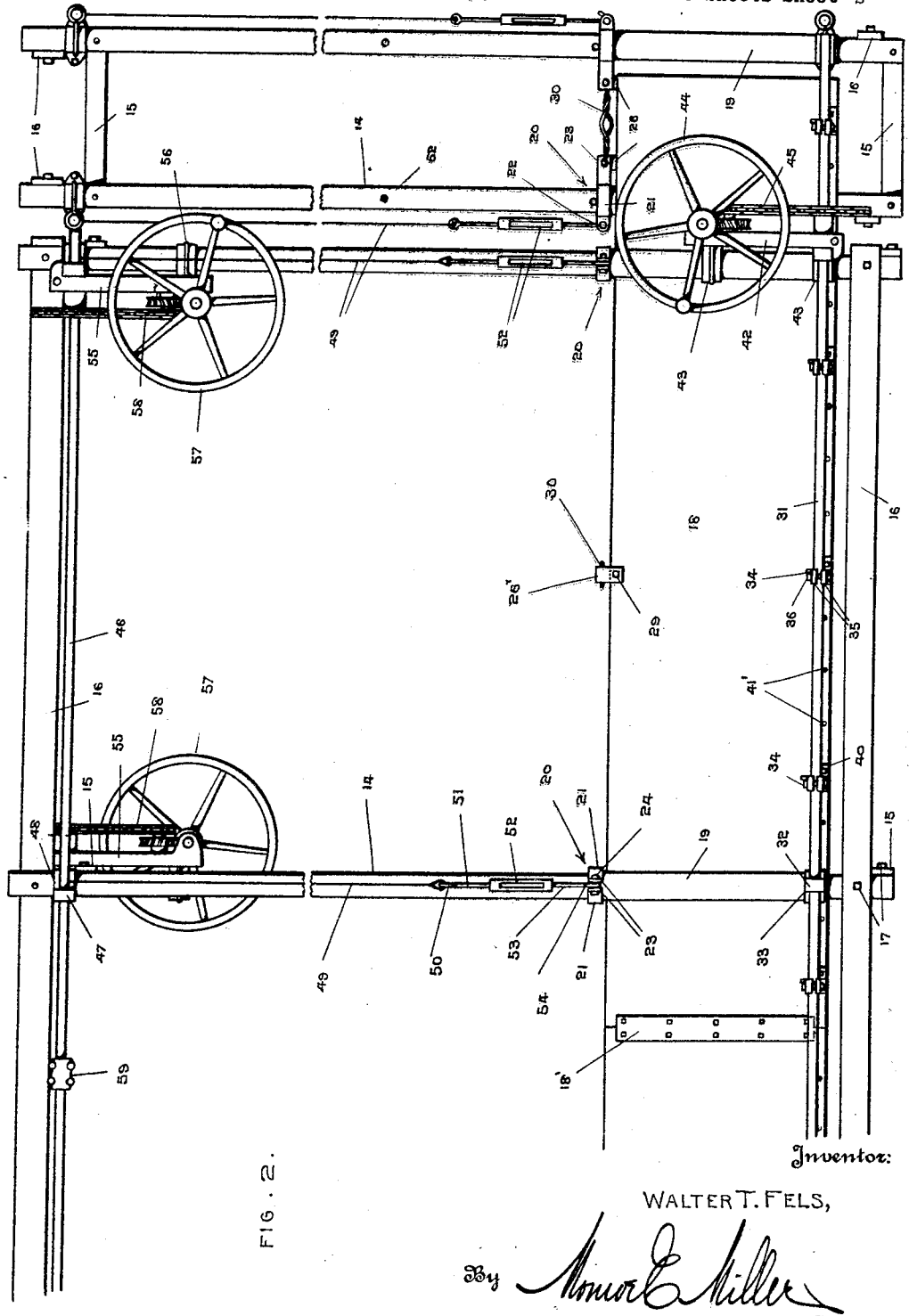

May 26, 1925.
W. T. FELS
1,539,658
WALL MOLDING APPARATUS
Filed Aug. 4, 1924     3 Sheets-Sheet 3
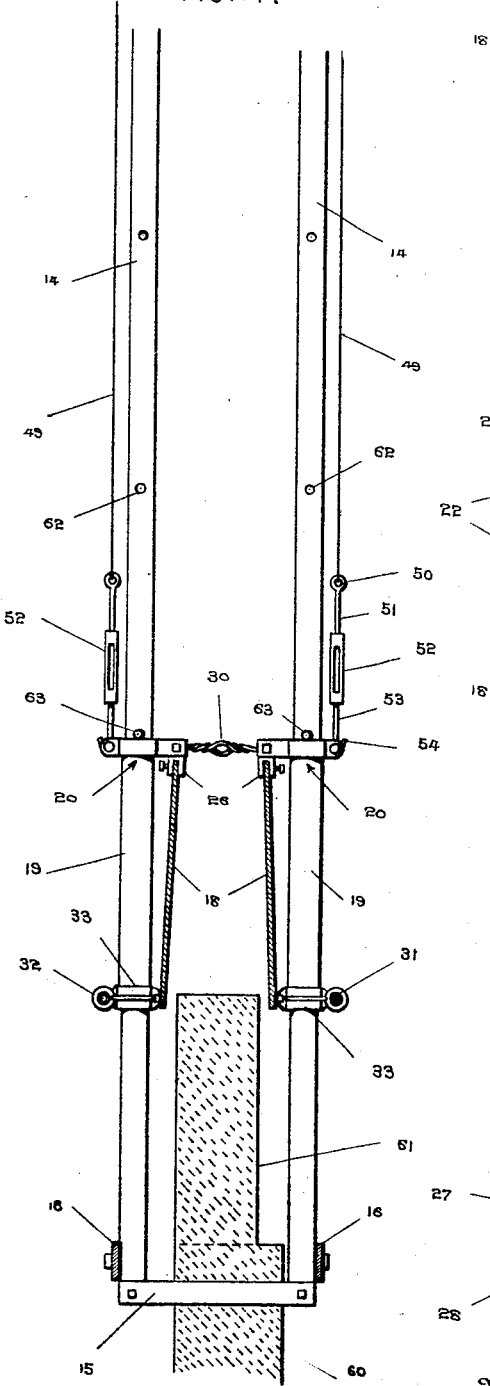
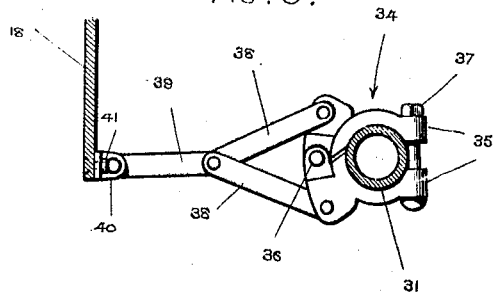
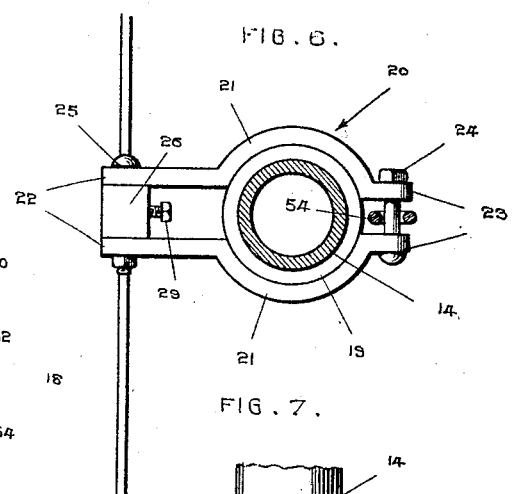
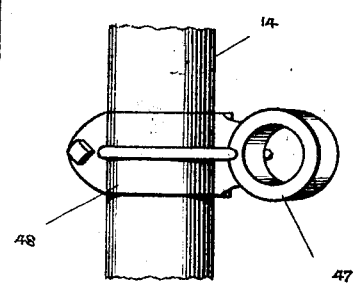
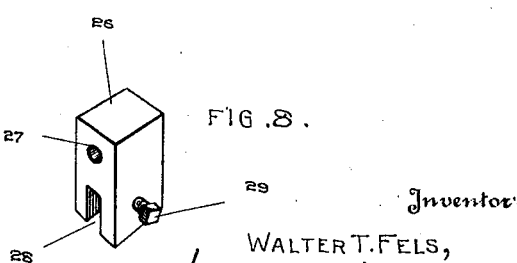
Inventor
WALTER T. FELS,
By Monroe E. Miller
Attorney.

Patented May 26, 1925.

1,539,655

UNITED STATES PATENT OFFICE.

WALTER THEODORE FELS, OF PHILADELPHIA, PENNSYLVANIA, ASSIGNOR OF ONE-HALF TO ALICE CORCORAN, OF PHILADELPHIA, PENNSYLVANIA.

WALL-MOLDING APPARATUS.

Application filed August 4, 1924. Serial No. 729,955.

*To all whom it may concern:*

Be it known that I, WALTER T. FELS, a citizen of United States, residing at Philadelphia, in the county of Philadelphia and State of Pennsylvania, have invented certain new and useful Improvements in Wall-Molding Apparatus, of which the following is a specification, reference being had therein to the accompanying drawing.

The present invention relates to apparatus for molding the walls of concrete or similar buildings, and aims to provide a novel and improved apparatus of that kind for molding the wall by means of superimposed courses, so that the apparatus as well as the process of molding will be comparatively simple and convenient.

Another object is the provision of a wall molding apparatus including a form for producing superimposed courses and novel means for mounting the form for vertical movement and for opening movement, so that the form can be opened after completing one course and then raised and positioned for forming the next upper course.

The invention also has for an object to improve the apparatus generally in the construction and combination of its component elements, to enhance the utility and efficiency of the apparatus.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a fragmentary plan view of the improved apparatus.

Fig. 2 is a fragmentary side elevation thereof.

Fig. 3 is a vertical section on the line 3—3 of Fig. 1.

Fig. 4 is a vertical section on the same section line as Fig. 3, showing the form opened and raised.

Fig. 5 is an enlarged side elevation of one of the toggle connections between the corresponding form plate and rock shaft.

Fig. 6 is an enlarged horizontal section on the line 6—6 of Fig. 2.

Fig. 7 is a perspective view of one of the shaft bearings and its supporting clamp.

Fig. 8 is a perspective view of one of the hinge blocks for the form plates.

The apparatus is constructed in sections, one section extending along each wall of the building, and each section can be the entire length of the wall. The sections can also be arranged at different angles relatively to one another, according to the form or plan of the building under construction. Fig. 1 shows two sections arranged at a right angle relatively to one another.

Each section of the apparatus for one wall of the building comprises a frame. This frame is composed of vertical standards or uprights 14, which may be metal tubing or pipes. Said uprights 14 are disposed at the inner and outer sides of the wall, and are of a suitable height according to the height of the wall to be constructed. Said uprights may be of suitable sectional construction so that they can be extended upwardly for two or more stories. The uprights 14 are connected at their upper and lower ends by cross bars 15, and are also connected by the longitudinal bars 16, said bars being secured to the uprights by means of bolts 17 extending through the uprights and bars.

The wall form is disposed between the inner and outer uprights 14, and comprises inner and outer plates 18 of sheet metal. Said plates are of suitable height to define one course of the wall, and the plates extend the length of the wall. Said plates may be in sections, with the sections secured together end to end in abutment by means of joint bars 18′ overlapping the adjacent ends of the sections and bolted thereto. The sections of plates can be of different lengths so that the form can be of any desired length, according to the length of the wall to be constructed.

The form plates 18 are mounted for vertical adjustment and for movement away from one another, so that the form can be opened and raised. Thus, sleeves 19 are slidable on the uprights 14 for carrying the plates 18, and clamps 20 embrace the upper ends of said sleeves and have the plates 18 hingedly suspended therefrom. The clamps 20 comprise the complementary arcuate sections 21 having the opposite terminals 22 and 23 spaced apart, with a bolt 24 engaging through the terminals 23 and a bolt 25 engaging through the terminals 22, for tightening the clamp on the sleeve when said bolts are tightened. A hinge block 26 is disposed between the terminals 22 of each clamp 20, and has an aperture 27 therethrough receiving the bolt 25, so as to hingedly suspend said block from the clamp. The block 26 has a slot 28 in its lower end to receive the upper edge portion of the corresponding plate 18, and a set screw 29 carried by the block 26 clamps the plate 18 in said slot 28. The blocks 26 are readily engaged over and secured to the upper edges of the plates, so that the parts are readily assembled.

Similar blocks 26' are engaged over the upper edges of the plates 18 between the uprights 14, and wires 30 are engaged through the apertures 27 of said blocks 26' and are twisted to provide ties or stays for preventing the upper edges of the plates being sprung away from one another by the pressure of the concrete or other plastic composition when poured and tamped between the plates. The wires or ties 30 loosely engage the blocks 26' above the plates. The joint bars 18' have their upper ends spaced below the upper edges of the plates so that the blocks 26 and 26' can be disposed above said bars 18' should the joint of a plate 18 come in the same position as a block 26 or 26'.

The plates 18 are swung toward and away from one another by means of rock shafts 31 parallel with the lower edge portions of the plates 18 and substantially in the horizontal plane of the lower edges of the plates. The shafts 31 are journaled in bearings 32 carried by clamps 33 which embrace the lower end portions of the sleeves 19, whereby the shafts are supported from the sleeves 19, so as to move upwardly and downwardly with the plates 18. Toggle connections are provided between the shafts and plates, as shown in detail in Fig. 5. A clamp 34 embraces the shaft 31, said clamp being composed of the sections 35 pivoted together as at 36, and having a clamping bolt 37 extending therethrough for swinging the sections 35 together so as to tightly embrace the shaft. Bars 38 are pivoted to the clamp 34 at opposite sides of the pivot 36 and converge together and have their adjacent ends pivoted to a link or bar 39. The link 39 is pivoted to an angle piece 40 which is secured to the lower edge portion of the corresponding plate 18 by means of a bolt 41. The bars 38 form one link of the toggle connection, between the link 39 and the clamp 34, and when the shaft 31 is turned to straighten out the toggle connection between the shaft 31 and plate 18, as seen in Fig. 5, the plate 18 is swung to vertical position and is held against movement away from the opposite plate. By turning the shaft to break the toggle joint, the plate 18 is swung away from the wall and opposite plate, as will be apparent. The plates 18 have longitudinally spaced apertures 41' along their lower edges for the reception of the bolts 41 so that the toggle connections can be located at the desired positions longitudinally of the plates.

Actuating means for each shaft 31 is provided, being carried by a bracket 42 having clamps 43 embracing one sleeve 19. Said bracket carries a hand wheel 44 which is geared, as at 45, to the shaft 31, thereby providing reduction gearing, so that the shaft can be turned with considerable power when rotating the wheel 44 by hand. The gearing 45 also locks the shaft 31 in any of its angular positions. One of the actuating devices is used for each shaft 31.

Means are provided for elevating the plates 18, and include horizontal shafts 46 adjacent to the upper ends of the uprights 14 and journaled in bearings 47 carried by clamps 48 embracing the uprights. The bearings 47 and clamps 48 are similar to the bearing 32 and clamps 33 excepting that they are secured directly on the uprights 14 while the clamps 33 are secured on the sleeves 19. Wires 49 or other flexible elements engage through apertures in the shafts 46 to be wound on said shafts, and the lower ends of said wires are secured in the eyes 50 of rods 51 which are connected by turn-buckles 52 with rods 53 having hooks 54 that engage the bolts 24 between the terminals 23 of the clamps 20. The turn-buckles 52 permit of adjustments being made so that all of the wires 49 are taut with the plates 19 supported at the same height. The shafts 46, as well as the shafts 31, can be composed of sections disposed end to end, with the adjacent ends secured together by suitable couplings 59. An actuating device, similar to the actuating device for each shaft 31, is also employed for each shaft 46, and comprises a bracket 55 having clamps 56 embracing one upright 14 at the upper terminal thereof. A hand wheel 57 is carried by the bracket 55 and is geared, as at 58, to the shaft 46, the gear ratio being such that the shaft 46 can be turned easily by the rotation of the wheel 57 to wind the wires 49 on the shaft 46.

The apparatus is readily erected, and the uprights 14 and lower bars 15 and 16 are supported on the foundation, cellar wall, or the like. The foundation or cellar wall is indicated at 60, and to form the first or lowermost course of the wall, the plates 18 are adjusted so that their lower edges contact with the foundation 60. The shafts 31 are turned so as to swing the plates 18 toward one another to vertical parallel position, as seen in Fig. 3. The concrete or other plastic composition is then poured between the plates and tamped. A quick setting concrete or plastic composition is used that will set in a comparatively short time, say about one-half of an hour. The forms extend completely around the building, so that the courses at the different walls of the building can be poured in succession and by the time the first-poured portion of the course is reached, same will have set sufficiently so that the corresponding section of the form can be raised. During the meantime, the other portions of the first course will harden, so that the forms can be raised in succession. After the lower course 61 has set, the shafts 31 are swung so as to swing the plates 18 apart, away from the course, thereby spacing the plates from the surfaces of said course, so that the plates can be raised clear of said course 61. The shafts 46 are then rotated to wind the wires 49 thereon, thereby raising the sleeves 19 and plates 18. The uprights 14 are provided with vertically spaced apertures 62 through which pins 63 can be inserted for limiting the upward movement of the sleeves 19 when they have been raised to bring the plates 18 into position for the next course of the wall, as seen in Fig. 4. The shafts 31 are then turned to swing the plates 18 toward one another to vertical position, and their lower edges overlap the upper portion of the course 61. The concrete or plastic material is then poured between the plates on the lower course 61, thereby forming the next or second course, which unites with the lower course. This operation is repeated so as to build the wall up course by course, to provide an integral solid wall. Reinforcing bars can be placed between the plates 18 to be embedded in the concrete, and door and window frames, and the like, can also be inserted between the plates, so that the concrete can be poured around the frames to embed the frames in the wall. When inserting reinforcing bars, window and door frames, or the like, the blocks 26' and wires 30 can be removed or adjusted accordingly, and it will be noted that the space between the plates 18 and uprights 14 above said plates is not obstructed, so that the concrete can be readily poured and the reinforcing bars, window and door frames, and other members placed between the plates 18 as the wall progresses. The construction is simple and many if not all of the details can be purchased in the market, so as to be assembled in combination, according to the construction shown and described. By building up the wall course by course, complicated forms are eliminated, thereby not only simplifying the form or apparatus itself, but also simplifying the process, and eliminating the use of knock-down forms of elaborate built-up structure.

Having thus described the invention, what is claimed as new is:—

1. In a wall molding apparatus, a frame including uprights, members slidable vertically on said uprights, a form including a side plate having its upper edge portion hingedly connected with said members for the swinging movement of the lower edge portion of said plate toward and away from said uprights, and means carried by said members and connected to the lower edge portion of said plate for swinging the plate toward and away from the uprights.

2. In a wall molding apparatus, a frame including uprights, members slidable vertically on said uprights, a form composed of opposite side plates between said uprights, the plates having hinge connections at their upper edges with said members to swing about horizontal axes, means carried by said members and connected to the lower edge portions of said plates for swinging the plates toward and away from one another, and means connected to said members for elevating them.

3. In a wall molding apparatus, a frame including uprights, members slidable vertically on said uprights, hinge blocks hingedly connected with said members, a form plate, said blocks having means to detachably engage the upper edge portion of the plate and to be adjusted longitudinally of said edge portion, means between said members and plate for swinging the plate, and means for elevating said members.

4. In a wall molding apparatus, a form composed of opposite plates, means for supporting said plates with which the upper edge portions of the plates have hinge connections, said means having provision for swinging the plates toward and away from one another, means for guiding and elevating said means for vertical movement, members detachably engaging the upper edge portions of the plates and adjustable longitudinally of said edge portions, and ties connecting said members.

5. In a wall molding apparatus, a frame including uprights, members slidable vertically on said uprights, a form plate hingedly connected at its upper edge with said members, means for elevating said members, bearings carried by said members, a horizontal shaft journaled in said bearings, and operative connections between said shaft and lower portion of said plate for swinging the plate toward and away from the shaft.

6. In a wall molding apparatus, a frame including uprights, members slidable vertically on said uprights, a form plate hingedly connected at its upper edge with said members, means for elevating said members, bearings carried by said members, a horizontal shaft journaled in said bearings, and toggle connections between said shaft and lower portion of said plate.

In testimony whereof I hereunto affix my signature.

WALTER THEODORE FELS.